United States Patent [19]

Nussbaumer et al.

[11] Patent Number: 4,679,312
[45] Date of Patent: Jul. 14, 1987

[54] METHODS AND APPARATUS FOR THE AUTOMATIC PRODUCTION OF STATORS FOR ELECTRIC MOTORS

[75] Inventors: Manfred Nussbaumer; Bruno Fischer, both of Dietikon, Switzerland

[73] Assignee: Micafil AG, Zurich, Switzerland

[21] Appl. No.: 825,908

[22] Filed: Feb. 4, 1986

[30] Foreign Application Priority Data

Feb. 15, 1985 [CH] Switzerland .................... 0717/85

[51] Int. Cl.⁴ ............................................. H02K 15/06
[52] U.S. Cl. ......................................... 29/596; 29/732;
29/736; 242/1.1 R
[58] Field of Search ............... 29/596, 732, 736, 606,
29/759; 242/1.1 R, 1.1 A, 1.1 E

[56] References Cited

U.S. PATENT DOCUMENTS 4,151,636  5/1979  Lauer ................................. 29/596
4,285,119  8/1981  Habegger .......................... 29/596

Primary Examiner—Carl E. Hall
Attorney, Agent, or Firm—Burns, Doane, Swecker & Mathis

[57] ABSTRACT

Stators are produced by advancing stator workpieces successively to a plurality of work stations. The stators are mounted in holders which each comprises a pair of downwardly depending legs resting on a pair of horizontally spaced conveyor belts. The belts are continuously driven to advance the holders to the work stations. At each station the holder is restrained from movement (e.g., by being lifted off the belts) while the belts continue to be driven. At a winding station, upper and lower winding forms are advanced toward a stator workpiece, the lower form passing between said belts and legs.

7 Claims, 3 Drawing Figures

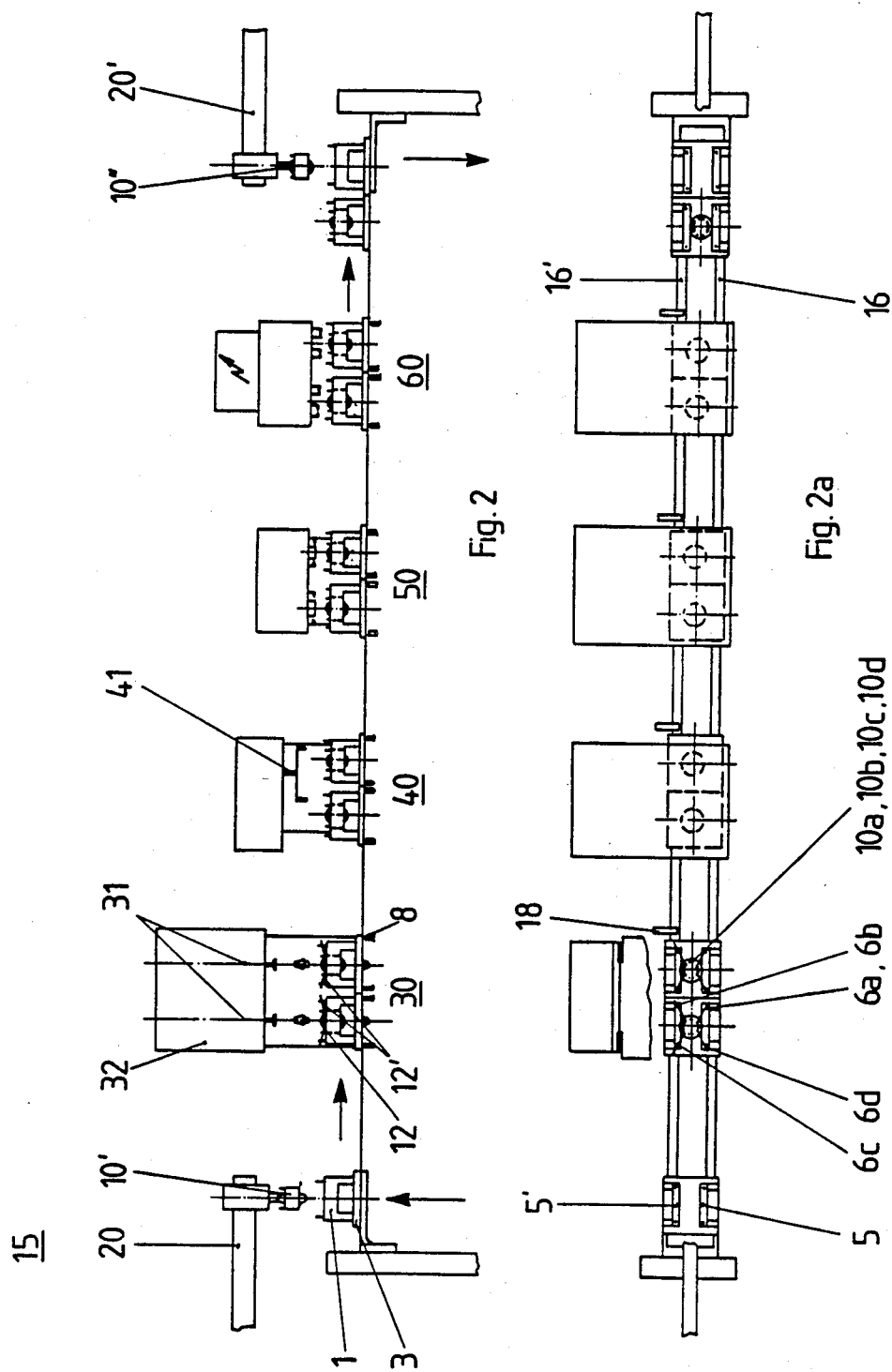

METHODS AND APPARATUS FOR THE AUTOMATIC PRODUCTION OF STATORS FOR ELECTRIC MOTORS

BACKGROUND AND OBJECTS OF THE INVENTION

The present invention relates to an apparatus for the automatic production of stators for electric motors.

There are known installations permitting the fully or semi-automatic production of stators for example by means of automatic winding machines comprising a rotating table which defines a series of circumferentially spaced operating stations. These known installations make possible the winding of wires to a stator; the application of wire ends to the joining pieces; the joining of those ends to the pieces by welding or soldering, and electrical testing of the wires.

A substantial disadvantage of the known rotating table systems involves a limited expandability of the table for accessory devices due to the fixed circumferential dimension of the table. Also, even though a particular operation at a particular station may be completed, the table cannot be advanced until the operations at all stations have been completed. Thus, the overall process is inefficient from a time standpoint.

It is, therefore, an object of this invention to minimize or obviate problems of the types described above.

Another object is to provide methods and apparatus for the production of stators in which an infinite number of work stations can be provided.

A further object is to enable stators to be advanced to a subsequent work station before the operations being performed on stators at other stations have been completed.

It is an object of the invention to provide a workpiece holder for the fully automatic production of stators with an arbitrary number of processing stations, wherein the individual processing stations may have a configuration similar to that of commonly assigned, copending U.S. patent application Ser. No. 568,071 filed Jan. 4, 1984, now U.S. Pat. No. 4,553,321 issued Nov. 19, 1985, which is hereby incorporated by reference.

SUMMARY OF THE INVENTION

These objects are achieved by the present invention in which stator workpieces are advanced successively to a plurality of work stations. The stators are mounted in holders which each comprises clamping jaws and generally vertically extending legs which engage a pair of horizontally spaced conveyor belts. The belts are continuously driven to advance the holders to the work stations. At each station the holder is restrained from movement while the belts continue to be driven. At a winding station, upper and lower winder forms are advanced generally vertically toward a stator workpiece, one of which forms traveling in a horizontal space formed between the belts and legs. Also, winder form holders are advanced generally horizontally toward the winder forms from opposite horizontal sides.

The configuration of the holder makes it possible to advance the winder forms in vertical directions, and to advance the winder form holders horizontally. The stator workpieces may thus remain immobilized in their holders during travel to all of the work stations. Also, the stator workpieces can be advanced to the work stations independently of one another to save time.

BRIEF DESCRIPTION OF THE DRAWINGS

The drawing shows a preferred embodiment of the invention, wherein:

FIG. 2 is a schematic side elevational view of an apparatus for producing stators, including conveyor belts, workpiece holders, and work stations, and FIG. 2a is a top plan view of the apparatus depicted in FIG. 2.

DETAILED DESCRIPTION OF A PREFERRED EMBODIMENT OF THE INVENTION

Figure 1:
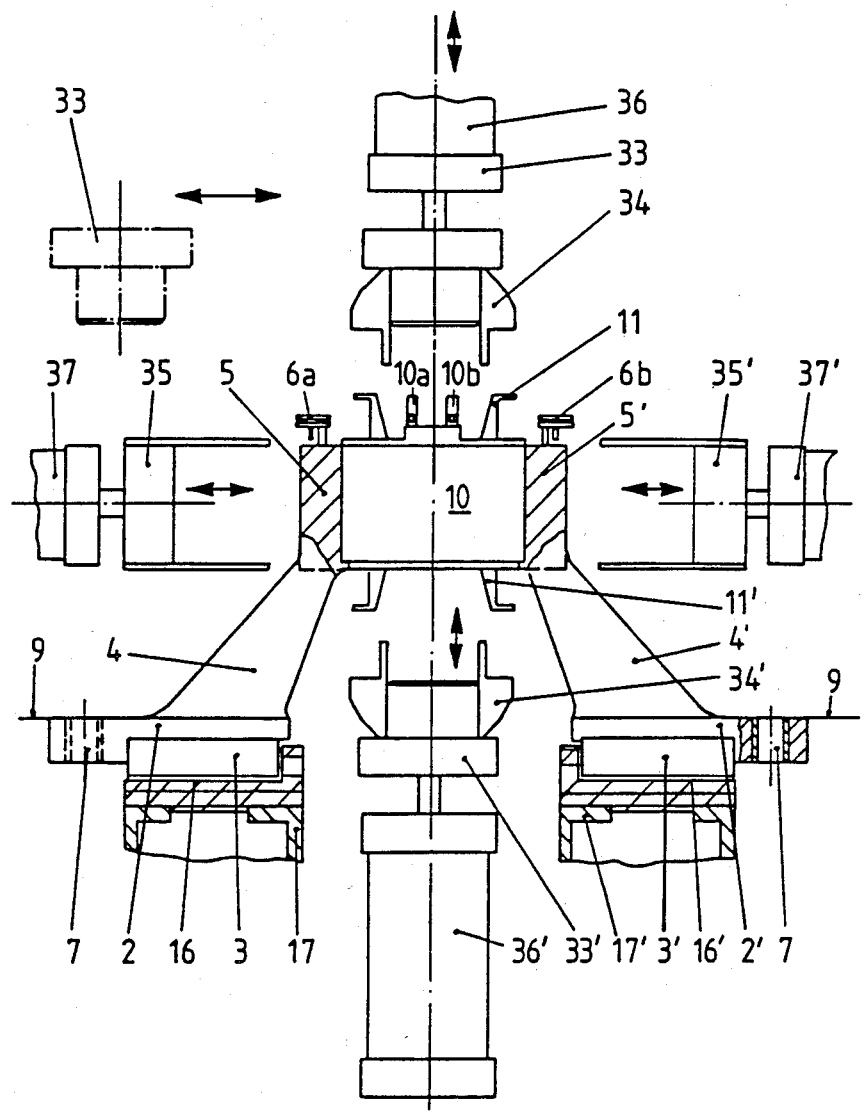
FIG. 1 is a cross-section through a workpiece holder according to the invention.

In the figures there is depicted a workpiece holder, in which a stator 10 with four wire connecting pieces 10a, 10b, 10c, 10d for the wire ends 12' is clamped-in. The workpiece holder 1 is shown in FIG. 1 at a winding station 30 (see also FIGS. 2, 2a). The workpiece holder 1 has the configuration of a portal with two legs 2, 2' carrying guide plates 3, 3' resting on conveyor belts 16, 16'. The two conveyor belts 16, 16' are traveling synchronously.

The legs 2, 2' are joined with upwardly tapering supports 4, 4' which form holding jaws 5, 5' to receive the stator 10. This configuration renders possible the introduction of winding forms 34, 34' so that the lower winding form 34' may be placed without hinderance between the portal-like supports 4, 4' into the stator 10 held by the holding jaw 5, 5'. In a similar manner, the upper winding form 34 is set into the stator 10 from above. Simultaneously, winding form holders 35, 35' are inserted laterally over the holding jaws 5, 5' from both sides. To hold the winding wire ends 12' of a winding 12, two auxiliary winding clamps 6a, 6b, 6c, 6d are provided on each of the holding jaws 5, 5'. The configuration of the workpiece holder 1 according to the invention further makes possibe unimpaired working in all of the processing stations 30, 40, 50, 60 indicated in FIGS. 2 and 2a, without having to remove the stator 10 from the workpiece holder 1 or placing it into a different position.

These preparations for the further processing of the stators is followed by the winding, the application of the winding wire ends to the wire joining pieces 10a, 10b, 10c, 10d and their joining, for example, by welding, soldering or crimping, and electrical testing, in a manner similar to the processing and transport system described in the fore-mentioned U.S. Pat. No. 4,553,321.

To facilitate an understanding of the invention, FIGS. 2 and 2a provide a representation of a processing line 15 with the stator charging and discharging stations 20, 20' and the processing stations 30, 40, 50, 60. An unwound stator 10' is introduced at the charging station 20, and a wound stator 10'' is removed from the discharging station 20'. Station 30 constitutes a winding station; 40 a winding wire end application station; 50 a station for joining the winding ends (for example by welding, soldering or crimping); and 60 an electrical testing station.

The workpiece holders 1 are advanced frictionally by the conveyor belts 16, 16' and may be arrested in the individual stations 20, 30, 40, 50, 60, 20', individually and/or in groups, by means of controlled stops 18 which halt movement of the holder(s) 1 relative to the continuously revolving conveyor belts 16, 16'. Thus, a continuous, cycle-independent working process is assured. A second pair of conveyor belts, not shown, may be placed, for example, in the lower plane of the apparatus, in order to transport empty workpiece holders 1 back to the charging station 20. The two pairs of conveyor belts can be connected with each other by means of elevators at the stator discharge station 20' for downward movement in the direction of the arrow in FIG. 2 and at the charging station 20 for upward movement in the direction of the arrow. To position and immobilize the workpiece holders 1 in each of the processing stations 30, 40, 50,60, the clamping surfaces 9 of the workpiece holders 1 carry positioning bushings 7 (FIG. 1), which are engaged by locating holding bolts 8 which lift the workpiece holder 1 from the conveyor belts 16, 16' and position and immobilize the holder in the manner disclosed in the afore-mentioned U.S. Pat. No. 4,553,321.

In the processing line 15 at least one winding station 30 (see also FIG. 1) with a winding drive 32 for two winding spindles 31, is provided. Both the introduction and the removal of the winding forms 34, 34' along with their holders 33, 33', together with the insertion and extraction of the winding form holders 35, 35' into and from the stator 10 is effected by the cylinder/piston units 36, 36', and 37, 37', respectively. The holders 33, 33' are brought out laterally during the winding operation (see the holder 33 depicted in broken lines as it is being brought out). The winding of the stators 10 takes place in a manner known in itself, whereby the winding 12 is wound onto the end turn supports 11, 11' and the winding wire ends 12' are held in the auxiliary winding wire clamps 6a, 6b, 6c, 6d of the holding jaws 5, 5'. The workpiece holder 1 now carries a wound stator 10, with the winding wire ends 12' held in the auxiliary winding wire clamps 6a, 6b, 6c, 6d.

The holder then is brought to the winding end application station 40. Two parallel-moving grips 41 are freely programmable for movement in the coordinate axes X,Y,Z and are controlled by a computer. Those grips take the winding wire ends 12' held in the auxiliary winding wire clamps 6a, 6b, 6c, 6d and apply them to the corresponding wire joining pieces 10a, 10b, 10c, 10d. In the subsequent processing station 50, the winding wire ends 12' are joined with the wire end connecting pieces 10a, 10b, 10c, 10d of the stator 10 by welding, soldering or crimping. The wires are electrically tested in the test station 60, and the finsihed stators 10" are taken trom the stator discharge station 20'.

Although the present invention has been described in connection with a preferred embodiment thereof, it will be appreciated by those skilled in the art that modifications, additions, substitutions, and deletions not specifically described, may be made, without departing from the spirit and scope of the invention, as defined in the appended claims.

What we claim is:

1. In an apparatus for the production of stators for electric motors, said apparatus being of the type comprising a production line having a plurality of work stations, including a winding station, and conveyor means for advancing stator workpiece holders successively to said stations, the improvement wherein:
    said conveyor means comprises a pair of parallel, horizontally spaced belts driven synchronously in horizontally spaced relationship,
    each said holder comprising:
        jaws for securing a stator workpiece therebetween, and
        legs extending generally vertically from said jaws and including bearing surfaces engageable with respective ones of said belts to form a horizontal space between said legs,
    said winding station comprising:
        upper and lower winding forms arranged to move generally vertically to approach a stator workpiece from above and below, with one of said winding forms arranged to travel between said belts and said legs as it approaches said stator workpiece, and
        a pair of winding form holders arranged to move generally horizontally to approach said winding forms from opposite horizontal sides of said workpiece holder, and
    retaining means for retaining said stator holders at said stations while continuing to drive said belts so that said stator holders can be advanced independently of one another.

2. Apparatus according to claim 1, wherein said legs diverge downwardly toward said belts.

3. Apparatus according to claim 1, wherein said legs rest frictionally on said belts, said retaining means including stop means for halting advancement of a holder.

4. Apparatus according to claim 1, wherein said jaws carry a plurality of auxiliary winding wire clamps arranged diagonally in relation to one another.

5. Apparatus according to claim 1, wherein said legs extend downwardly into frictional engagement upon said belts.

6. A method of producing stators for electric motors, said method being of the type in which conveyor means advances stator holders along a production line successively between a plurality of work stations including a winding station, the improvement comprising the steps of:
    mounting stator workpieces between the jaws of respective said holders, said holders each including generally vertically extending legs,
    arranging bearing surfaces of said legs on respective ones of a pair of parallel, endless horizontally spaced belts which form said conveyor means, such that a horizontal space is formed between said legs,
    driving said belts synchronously to advance said holders to said work stations,
    retaining said holders at said stations while continuing to drive said belts, so that said holders can be advanced independently of one another, said retaining step including:
    retaining said holders successively at said winding station,
    advancing upper and lower winding forms generally vertically toward said holder from above and below, with one of said winding forms traveling between said belts and said legs, and
    advancing a pair of winding form holders generally horizontally from opposite horizontal sides of said workpiece holder.

7. A method according to claim 6, wherein the stator workpieces remain in the same workpiece holder during travel to all of said stations.

* * * * *